(No Model.) 2 Sheets—Sheet 2.
J. H. MILLER.
APPARATUS FOR PURIFYING WATER.
No. 331,151. Patented Nov. 24, 1885.
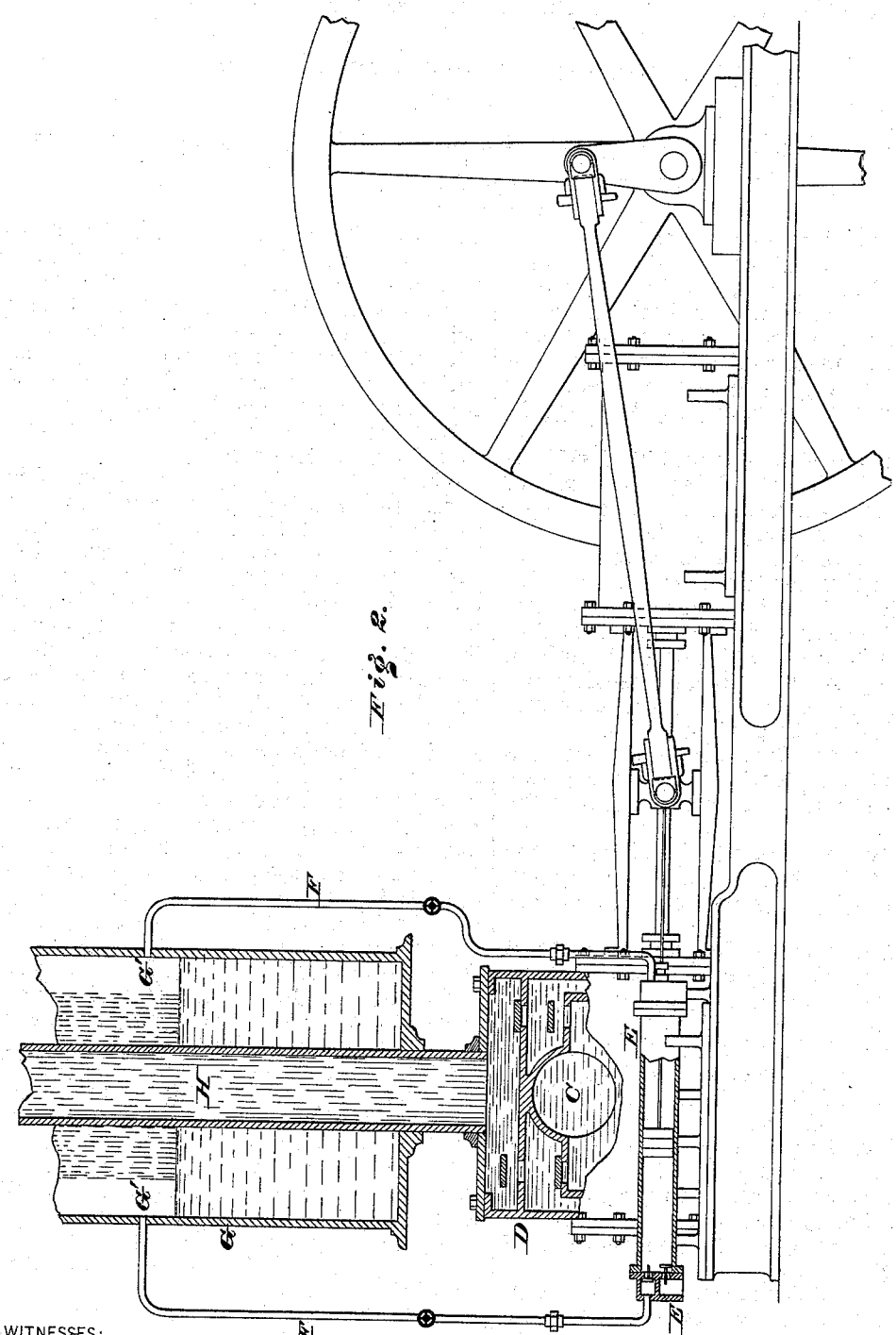

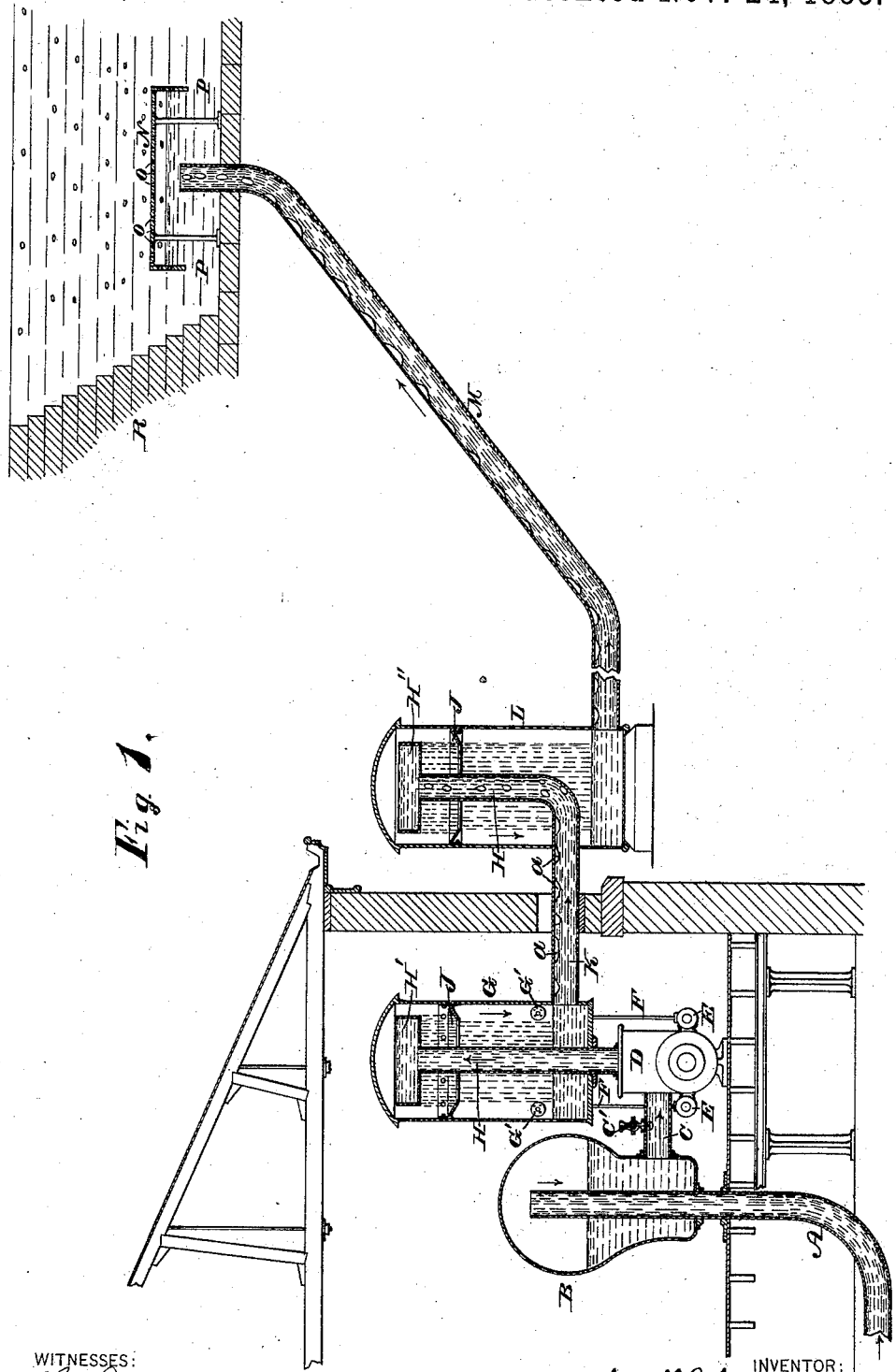

UNITED STATES PATENT OFFICE.

JOHN H. MILLER, OF PHILADELPHIA, PENNSYLVANIA.

APPARATUS FOR PURIFYING WATER.

SPECIFICATION forming part of Letters Patent No. 331,151, dated November 24, 1885.

Application filed September 29, 1884. Serial No. 144,210. (No model.)

*To all whom it may concern:*

Be it known that I, JOHN H. MILLER, a citizen of the United States, residing in the city and county of Philadelphia, State of Pennsylvania, have invented a new and useful Improvement in Air-Chambers, which improvement is fully set forth in the following specification and accompanying drawings, in which—

Figure 1 represents a longitudinal vertical section of a device embodying my invention. Fig. 2 represents a vertical section of a portion thereof on an enlarged scale.

Similar letters of reference indicate corresponding parts in the two figures.

One object of the invention is to simplify the aerification and purification of water. Another is to interpose an air space or cushion between the pump and main, thus securing an uninterrupted discharge from the main and an economical working of the pump.

Referring to the drawings, A represents a suction-pipe through which the water passes into the air-chamber B above the level of the way-pipe C.

An injector, or any suitable means for the admission of air into the pipe C, may be used. In the drawings a valve and cock, C', are shown.

D represents a pump the plunger or piston of which is attached in any suitable manner to air-pumps E E, of which any number may be employed.

F F represent pipes for the admission of air into the air-chamber G at openings G' G'. Water is forced into the chamber G by pipe H and distributer H', the latter being larger in diameter than the pipe H, and is suitably secured thereto. It has perforations in its bottom, so that the water will fall in spray through the air-space of the chamber.

J J are fenders attached to the inner side of the chamber G.

K represents a pipe for the passage of water into a second air-chamber, L, (one air-chamber only between the pump and reservoir need be used, but two or more may be, if desired.)

H'' represents a distributer constructed in a similar manner to the one lettered H'.

M represents a pipe leading into the reservoir R. Over the mouth of the pipe M within the reservoir is a hood or cap, N, having fine perforations O for the passage of air-globules, and on its side openings P, the tops of which are below the level of the rim of the inlet-pipe M.

This device can be used from a natural head—such as a main or other head of water—and is suitable for either liquids or gases.

Suitable man-holes and coverings can be placed on the chambers.

The operation of the device is as follows: Water entering the pipe A ascends to the top thereof and flows therefrom into the chamber B, from whence it is directed by gravity to the pipe C into the pump D. If desired to inject air in this pipe, it may be done by the cock C'. The water is driven or forced by pump D through pipe H and distributer H' into air-chamber G. The supply of air in the air-chamber is constantly replenished by means of the air-pumps E E, connected with the pump D. The water, in its passage through the air-chamber, will readily absorb the air, the surplus globules of which (marked *a* in the figures) will pass with the water through pipe K into a second air-chamber, L; or, if but one air-chamber is used between the pump and the reservoir, directly into the reservoir. In the air-chamber the water is divided into spray in the same manner as in part G. From chamber L the water flows through pipe M, carrying with it the surplus globules of air, which escape through the perforations in the hood or cap N into the water above the hood, the water passing through the openings P in the sides of the hood into the reservoir. The air in the chamber also serves as a cushion, and, owing to its elasticity, permits the steady and economical operation of the pump, causing the water to flow from the main uninterruptedly. The chambers may be placed in any position relatively to the pump. When it is not desired to aerify, the distributers H' H'' and cap N are dispensed with.

Having thus described my invention, what I claim as new, and desire to secure by Letters Patent, is—

1. The combination, with an inlet-pipe, of an air-chamber, an outlet-pipe therefrom having a valve therein, a pump communicating with said outlet-pipe, and a discharge pipe from said pump, the inlet of the air-chamber having its upper end above the level of the outlet-pipe thereof, substantially as described.

2. The combination of pipe A, air-chamber B, pipe C, and cock C', the inlet-pipe A projecting so far into the air-chamber that its upper end is above the level of the pipe C, substantially as described.

3. The pipe A, air-chamber B, pipe C, pump D, air-pump E, pipes F F, pipe H, and air-chamber G, having openings G' G', combined and operating substantially as described.

4. The pipe A, air-chamber B, pipe C, pump D, pipe H, air-chamber G, and outlet-pipe K, combined and operating substantially as described.

5. The pipe A, air chamber B, pipe C, pump D, air-pump E, pipe H, air-chamber G, and distributer H', combined and operating substantially as described.

6. The pump D, pipe H, air-chamber G, and distributer H', combined and operating substantially as described.

7. The pump D, pipe H, air-chamber G, air pump E, distributer H', and pipe K, combined and operating substantially as described.

8. The inlet-pipe A, chamber B, pipe C, pump D, pipe H, distributer H', pipe K, air-chamber L, pipe M, cap N, and reservoir R, combined and operating substantially as described.

JOHN H. MILLER.

Witnesses:
JOHN A. WIEDERSHEIM,
JNO. K. PLITT.